July 17, 1923.
H. WILKINSON
WHIP HOLDER
Filed May 16, 1922
1,461,993
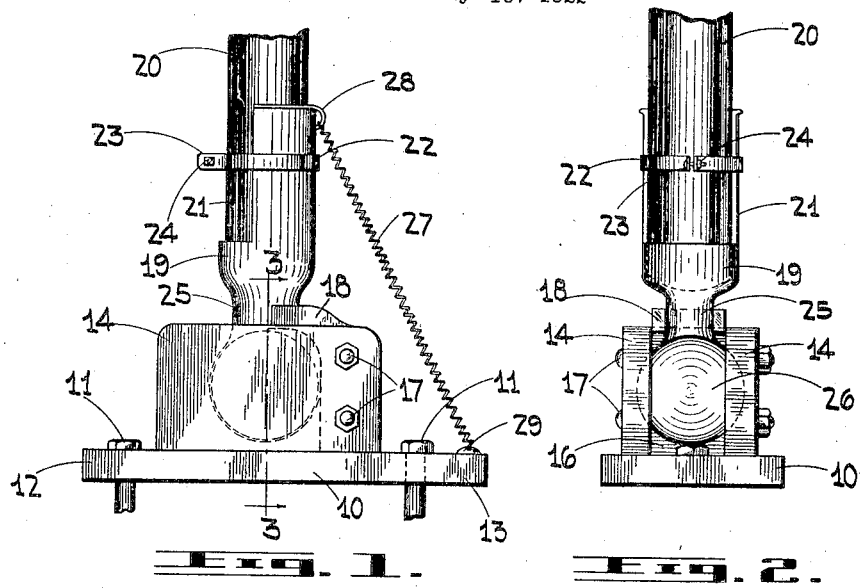
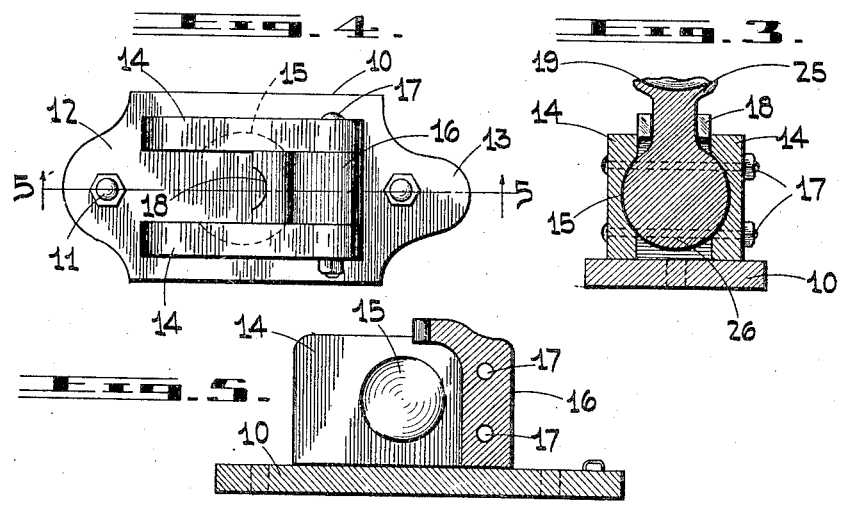
INVENTOR
HERBERT WILKINSON.
BY E.H.Bond
ATTORNEY.

Patented July 17, 1923.

1,461,993

UNITED STATES PATENT OFFICE.

HERBERT WILKINSON, OF EMPRESS, ALBERTA, CANADA.

WHIP HOLDER.

Application filed May 16, 1922. Serial No. 561,483.

*To all whom it may concern:*

Be it known that I, HERBERT WILKINSON, a citizen of Dominion of Canada, and resident of Empress, in the county of Medicine Hat and Province of Alberta, Dominion of Canada, have invented certain new and useful Improvements in Whip Holders, of which the following is a specification.

This invention has relation to certain new and useful improvements in a whip holder which may be employed on agricultural implements such as a binder so as to relieve the operator of the necessity of carrying the whip in the hand while operating the implement.

The invention has for an object the provision of a whip holder which will be of extremely simple and inexpensive construction, may be readily and cheaply manufactured and will serve to normally hold the whip in unoperated position.

Another object of the invention resides in the provision of a whip socket of the character stated which will be of such construction that it may be readily operated or handled by the driver to touch up any one of the draft animals without removing the whip from its socket.

A further object of the invention resides in the provision of a whip holder of the character stated which will include a pivotally mounted socket in which the whip butt may be clamped so that the whip and the socket may be resiliently retained in unoperated position within easy reach of the driver, the whip holder including means to resiliently return the whip and socket to upright position when released.

The invention has for a still further object the provision of a whip holder of the character stated which will be composed of the minimum number of parts of simple and novel construction and arrangement.

With the foregoing and other objects in view as will appear as the description proceeds, the invention consists in the novel construction, combination and arrangement of co-operating elements as hereinafter more specifically set forth, claimed and shown in the accompanying drawings forming a part of the present application, in which:

Fig. 1 is a side elevation of the improved whip holder with a whip butt clamped therein.

Fig. 2 is a front elevation of the structure shown in Fig. 1.

Fig. 3 is a detail section substantially on the plane of line 3—3 of Fig. 1, looking in the direction indicated by the arrows.

Fig. 4 is a plan view of the holder with the socket and return spring removed.

Fig. 5 is a detail longitudinal section substantially on the plane of line 5—5 of Fig. 4, looking in the direction indicated by the arrows.

Referring more in detail to the drawings in which similar reference characters designate corresponding parts throughout the several views, 10 indicates the base plate which may be secured by bolts 11 passing therethrough or by any other suitable means, on a binder or any other agricultural implement, vehicle or the like. This base plate 10 may have end extensions 12 and 13 with suitable openings provided therein for the bolts 11, as shown in the drawings. Spaced parallel side plates 14 are provided on the upper side of the base plate 10 and have in their opposed faces the concaved recesses 15, the purpose of which will presently appear. A rear stop plate 16 is positioned between the rear ends of the side plates 14 and secured in position by bolts 17 passing therethrough and through the side plates 14, as shown in the drawings or by any other suitable means. This rear stop plate 16 has a forwardly extended stop shoulder 18 at its upper end, the purpose of which will also be apparent as the description proceeds.

A whip butt receiving socket 19 is provided to accommodate the whip butt 20, as shown clearly in Figs. 1 and 2.

This whip socket 19 has an open side 21. A transversely split clamping ring 22 is extended around the socket 19 and around the exposed side portion of the whip butt 20. The outwardly extended parallel ends 23 of the transversely split ring 22 will be drawn together by the clamping bolt 24 to securely clamp the whip butt 20 within the whip socket 19. The whip socket 19 has a reduced extended end portion 25 which is preferably solid as shown in the drawings and terminates in an enlarged ball 26 engaging in the concaved recesses 15. When the socket 19 is in upright position, the reduced extension 25 thereof will engage the stop shoulder 18, as shown clearly in Fig. 1. A return spring 27 has its upper end secured to the upper end portions of the socket 19, as shown at 28, while its lower end is suitably connected to the extended rear end 13 of the base plate 10, as also shown clearly in Fig. 1. This spring 27 will serve to resiliently retain the socket 19 in upright position where it engages the groove in the stop shoulder 18 as previously stated.

It is believed the complete construction and operation of this device should now be clear from the foregoing paragraphs taken in connection with the accompanying drawings. It may be briefly stated, however, that when it is desired to employ the whip, it is simply necessary for the driver to press forwardly upon the whip socket 19 or the whip butt 20. A sufficient movement of the whip and whip socket 19 to either side is provided for, owing to the difference in the diameter of the reduced extended portion 25 of the socket 19 and the distance between the side plates 14, as will be clearly understood by referring to Figs. 2 and 3. As soon as the whip socket 19 and whip butt 20 are released, the spring 27 will serve to return the whip socket 19 to its normal or unoperated position, as shown in the drawings. The stop shoulder 18 will limit the return movement of the socket 19, as illustrated in Fig. 1. It is thought that further description is unnecessary.

While the preferred embodiment of the invention has been disclosed it is to be understood that minor changes in the details of construction and arrangement of parts may be resorted to within the scope of what is claimed without departing from the spirit of the invention.

What I claim as new is:

1. A whip holder comprising a whip carrying socket having a reduced extended end portion, a base plate, means carried by said base plate and said socket to mount the whip socket for swinging movement in one direction and limited movement at right angles thereto, means for clamping a whip butt within said socket, means for returning said socket to normal position and means cooperating with said reduced end portion to limit the return movement of said socket.

2. A whip holder comprising a base plate, a socket having a reduced extended end portion, means for clamping a whip butt within said socket, a ball and socket member for mounting said whip socket on said base plate, means carried by said base plate to resiliently retain the whip socket in normal position, said last mentioned means being connected with said whip socket, and means cooperating with said reduced end portion to limit the movement of said whip socket under influence of the last mentioned means.

3. A whip holder comprising a base plate, side plates supported on said base plate and having concaved recesses in their opposed faces, said side plates being spaced from one another, a whip socket having a reduced extended end terminating in an enlarged ball engaged in the recesses of said side plates, said whip socket having an open side, means for clamping engagement around said whip socket and around a whip butt engaged in said whip socket, said whip socket being adapted to be forced forwardly and a limited distance to either side, said whip socket being adapted to swing on said ball, means connected with said whip socket for returning said socket to normal position and a stop member carried by said base plate between said side plates to limit the return movement of said whip socket.

In testimony whereof, I affix my signature.

HERBERT WILKINSON.